UNITED STATES PATENT OFFICE.

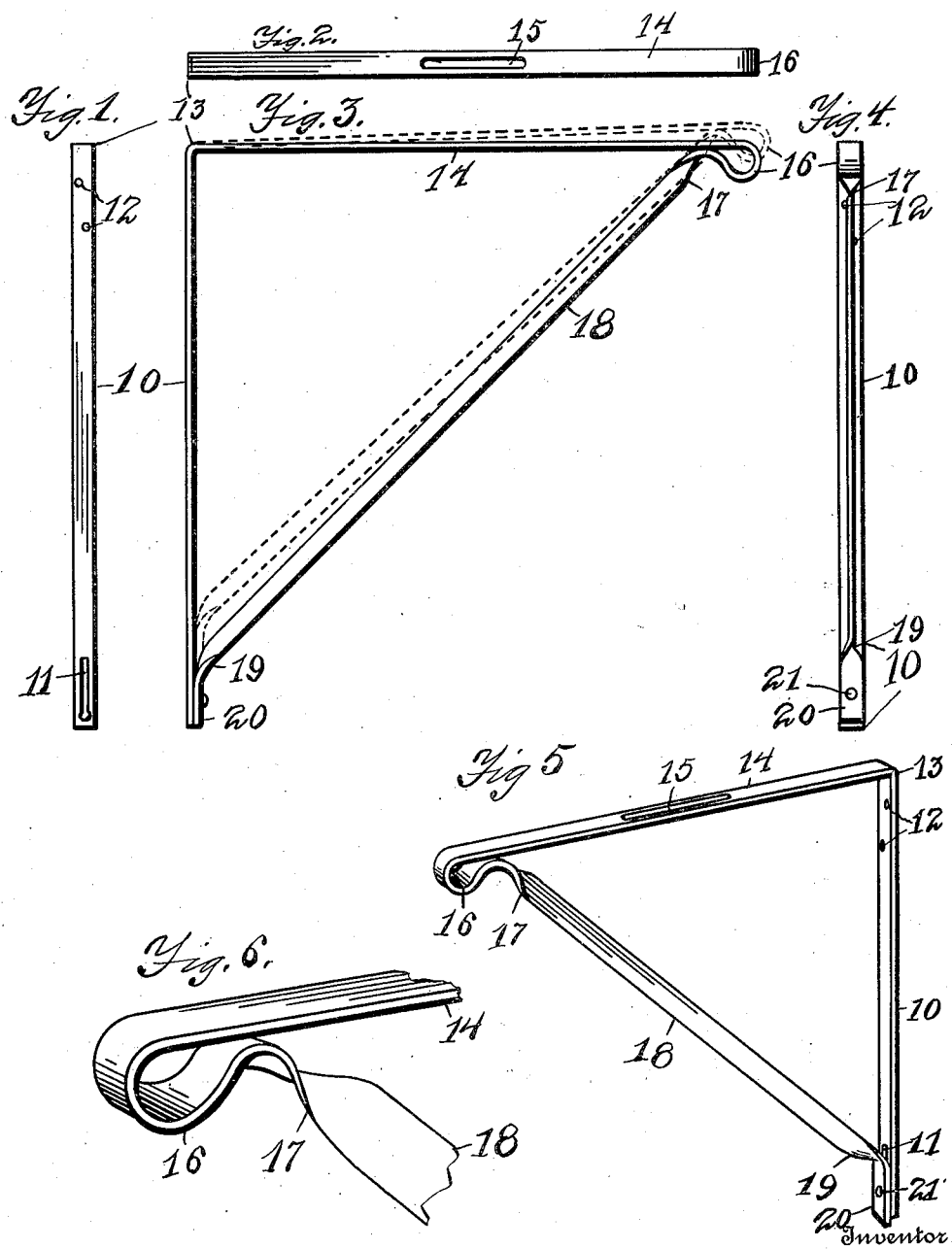

OSCAR L. SMEDBERG, OF JAMESTOWN, NEW YORK.

SINGLE-PIECE SHELF-BRACKET.

1,083,763. Specification of Letters Patent. Patented Jan. 6, 1914.

Application filed April 28, 1913. Serial No. 764,025.

*To all whom it may concern:*

Be it known that I, OSCAR L. SMEDBERG, a citizen of the United States, residing at the city of Jamestown, in the county of Chautauqua and State of New York, have invented certain new and useful Improvements in Single-Piece Shelf-Brackets, of which the following, taken in connection with the accompanying drawings, is a specification.

The invention relates to improvements in brackets for supporting shelves, sinks and similar articles; and the improvement consists in providing an exceedingly simple and durable bracket formed from one bar or strip of metal so constructed as to form an adjustable bracket of great strength; and the invention consists in the novel construction and arrangement of the bracket as shown and described in the following specification and the accompanying drawings and pointed out in the claim.

In the drawings, Figure 1 is an elevation of the rear side of the bracket or the side facing the wall; and Fig. 2 is a top plan view of the upper bracket arm. Fig. 3 is a side elevation of the bracket showing the adjustability of the supporting arm and upper bracket arm in dotted lines; and Fig. 4 is a front elevation of the bracket. Fig. 5 is a perspective view of the bracket; and Fig. 6 is a similar enlarged view of the front loop in the metal showing the arrangement of the same, the remainder of the bracket being broken away.

Like numerals of reference refer to corresponding parts in the several views.

The entire bracket is, as stated, made from one strip or bar of metal, according to the strength desired.

The numeral 10 designates the portion of the bracket adjacent the wall and has the lengthwise slot 11 near its lower end and the attaching holes 12 near the upper end. The angular bend 13 in the strip of metal turns it outward to form the upper bracket arm 14 which has the attaching slot 15 therein. At the outer end of the arm 13 the metal strip is turned downward in the plane of the arm 14 in a curved loop 16 and up beneath the arm 14 until it touches or almost touches said arm. It is then turned downward still in the horizontal plane, and immediately beneath the downward turn it is given a half turn 17 so that the supporting inclined portion 18 stands edgewise toward parts 10 and 14. The metal strip is given a half turn 19 near its lower end and its lower end 20 is thereby turned into the vertical plane of the part 10 so that it fits and braces squarely against said part. The end 20 has the hole 21 therethrough to receive the attaching screw or nail, which preferably extends through the slot 11 and into the side wall.

The horizontal plane of the arm 14 may be varied according to the length of the slot 11, since it is obvious that the attaching screw in the hole 21 may be placed at any point in said slot 11, thereby springing the metal arms 14 and 18 upward or downward, as shown in solid and dotted lines in Fig. 3, thereby accommodating the bracket to uneven walls and insuring a true level for the supporting arm 14. The slot 11 is preferably given the form of the key hole slot, as shown in Fig. 1, particularly in certain forms of heavy brackets when it is desirable to place a separate flat headed attaching screw in the hole at the bottom of the slot 11, the attaching screw through the hole 21 extending through the slot 11 above the attaching screw for the part 10.

The loop connection or continuation between the outer end of the horizontal arm and the inclined supporting arm obviously forms a very strong, yet easily adjustable, connection therebetween which shuts firmly together or springs apart according to the adjustment desired by the user or necessitated by the unevenness of the wall.

I claim as new—

A bracket consisting of a single strip of metal bent to form a triangle with two downwardly extending legs, said rear leg extending at a substantial right angle from the horizontal upper portion of the bracket and the front leg connecting the front end of the horizontal portion with the lower end of the rear leg, the lower end of the front leg being turned in the plane of the rear leg to slidably press against the same, the lower end of the rear leg having a lengthwise slot for the adjustable attachment of the lower end of the front leg to thereby adjust the plane of the horizontal portion of said bracket, substantially as and for the purpose specified.

In testimony whereof I have affixed my signature in the presence of two witnesses.

OSCAR L. SMEDBERG.

Witnesses:
H. A. SANDBERG,
M. D. MILLER.

Copies of this patent may be obtained for five cents each, by addressing the "Commissioner of Patents, Washington, D. C."